United States Patent [19]

Barbier et al.

[11] 4,316,266
[45] Feb. 16, 1982

[54] METHOD OF REFLECTION POINT CORRELATION SEISMIC SURVEYING

[75] Inventors: Maurice G. Y. Barbier, Pau; Philippe J. Staron, Mennecy, both of France

[73] Assignee: Societe Nationale Elf Aquitaine (Production), Courbevoie, France

[21] Appl. No.: 8,578

[22] Filed: Feb. 1, 1979

Related U.S. Application Data

[63] Continuation of Ser. No. 780,846, Mar. 24, 1977, abandoned.

[30] Foreign Application Priority Data

Mar. 30, 1976 [FR] France .................. 76 09118

[51] Int. Cl.³ .................. G01V 1/20; G01V 1/28; G01V 1/38
[52] U.S. Cl. .................. 367/21; 367/23; 367/41; 367/56; 367/58; 367/59
[58] Field of Search .................. 367/15, 20–24, 367/56, 59, 41, 58

[56] References Cited

U.S. PATENT DOCUMENTS

| | | | |
|---|---|---|---|
| 3,431,999 | 3/1969 | Glazier | 367/56 |
| 3,601,790 | 8/1971 | Sasseen | 367/56 |
| 3,747,056 | 7/1973 | Treybig et al. | 367/56 |
| 3,775,738 | 11/1973 | Quay et al. | |
| 3,790,929 | 2/1974 | Mayne et al. | |
| 3,811,111 | 5/1974 | Barbier et al. | |
| 3,838,390 | 9/1974 | Nuchan et al. | 367/56 |
| 3,956,730 | 5/1976 | Barbier | |
| 4,016,531 | 4/1977 | Cook et al. | |

FOREIGN PATENT DOCUMENTS 2325361 12/1973 Fed. Rep. of Germany.

Primary Examiner—Howard A. Birmiel
Attorney, Agent, or Firm—Brisebois & Kruger

[57] ABSTRACT

A method of seismic exploration comprises transmitting waves from transmission sources into the medium to be explored and picking up signals in a receiver and recording these as traces, the signals being produced by reflection in the medium, the sequential transmission of the sources taking place at intervals less than the reflection time of the longest transmitted waves, the repeated transmission of any one source taking place at intervals at least equal to the said reflection time and therein being an intercorrelation function of a series of transmission instants of all the sources and a series of transmission instants of any one of the sources to give a relationship between the maximum peak amplitude and the secondary residue amplitude greater than a predetermined value and grouping the recorded traces corresponding to the same reflection point, adjusting the traces in relation to the associated source providing the information relating to the reflection point and adding together the adjusted traces relating to the same reflection point.

4 Claims, 3 Drawing Figures

METHOD OF REFLECTION POINT CORRELATION SEISMIC SURVEYING

This is a continuation, of application Ser. No. 780,846, filed Mar. 24, 1977, now abandoned.

BACKGROUND OF THE INVENTION

The present invention relates to a method of exploration of a medium by transmitting energy, and more particularly, a method of geophysical marine prospecting by creating seismic waves making it possible to obtain several distinct seismic profiles simultaneously of a selected geological region.

A method is known in which an energy pulse is transmitted from the transmission point, said energy pulse giving rise to mechanical waves in the medium to be explored which are capable of undergoing reflections particularly on the reflecting surfaces comprising the interfaces between successive geological layers of the said medium. This method, which is used with several sources of transmission either aligned or not with the receiver or receivers, is characterized in that the time intervals which separate two wave transmissions or consecutive pulses, each produced by one of the said transmission sources, are shorter than the time which it takes the longest wave to cover the return distance when being propagated in the medium to be explored, that each transmission source transmits waves separated by a time interval at least equal to the said time it takes the waves to cover the distance when being propagated in the medium, and that the points in time when transmission takes place are selected in such a way that, by cross-correlating the series of transmission times of at least one of the said transmission sources with the series of transmission times of all the sources, a function is obtained, during the course of the time defined by the said time which it takes the longest wave to cover the return distance when being propagated in the medium to be explored, in which the relationship between the peak maximum amplitude and the amplitude of each secondary residue is greater than a predetermined value, e.g. the relationship between the amplitudes of the signals received in the intervals of time corresponding to the intervals of time separating the maximum peak from each of the secondary residues or lobes.

This method makes it possible to use several transmission sources which are difficult or impossible to synchronize and to obtain information, without additional recording time, coming from the different reflection points; moreover, it also makes it easy to separate the information coming from the different reflection points and recorded simultaneously and thus to determine the detected reflecting surfaces precisely.

Thus when processing the recordings obtained by means of the receivers, separation of the information is carried out at the level of each transmission source, i.e. the proper information is determined at each transmission source. As the transmission sources are perfectly arranged in relation to the different receivers or geophones and especially as all of the transmitter-receiver sources are immobile during the course of the entire transmission it is possible, when there is seismic movement on land, to carry out the necessary number of transmissions in order that the crosscorrelation functions defined above by the transmission code should be satisfactory.

With marine seismology the transmission sources and receivers are displaced continuously and substantially at a constant speed; consequently for a given firing area which is carried and located there is the fear of not having enough information relating to a reflection point, which is defined by geophysicists as being the point in the strata of interface which is located on the mediator of the segment connecting a transmission source to the receiver with which it is associated.

SUMMARY OF THE INVENTION

It is an object of the present invention to make the best possible use of the method described above in marine seismology and to increase the number of pieces of information on reflection points per reflection surface detected by the transmission waves.

According to the invention, there is provided a method of exploring a medium comprising transmitting waves produced by transmission sources arranged in preddetermined relative positions into the medium to be explored, picking up in at least one receiver signals produced by reflection of said waves at reflection points in said medium, recording said signals picked up in said receiver, controlling the transmission of said waves by said transmission sources to provide wave transmission at intervals less then the time taken for the longest wave to travel from said transmission source to said receiver, to provide wave transmission intervals of each source at least equal to said time taken for said longest wave to travel from said transmission source to said receiver and to provide intercorrelation or cross-correlation functioning of a series of transmission instants of all said sources with a series of transmission instants of any one of said sources to give a relationship between the maximum peak amplitude and the secondary residue amplitude greater than a predetermined value, grouping recorded traces corresponding to the same reflection point, adjusting or shifting said recorded traces in relation to the transmission instant of the source providing the recorded trace information relating to said reflecting point and adding all said adjusted recorded traces relating to the same reflection point.

BRIEF DESCRIPTION OF THE DRAWINGS

The invention will now be described in greater detail by way of example with reference to the drawings.

DESCRIPTION OF THE PREFERRED EMBODIMENTS

Figure 1:
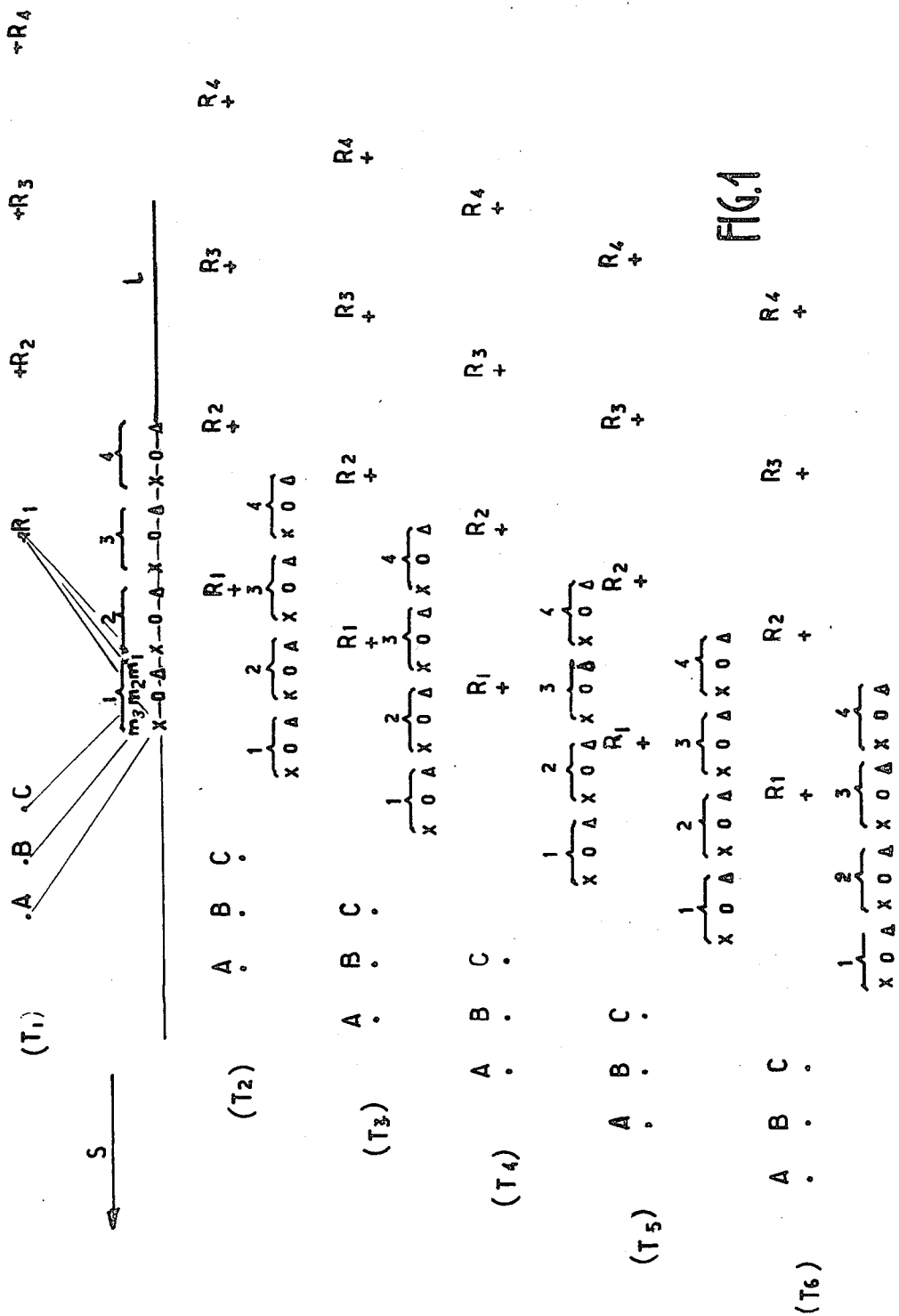
FIG. 1 is a schematic view of the transmission carried out in marine prospecting having three sources A, B, C and four receivers being displaced with the sources, there being three reflection points which are of interest, $m_1$ to $m_3$.

Basically, the invention proposes a method which is of a type for exploration of a medium, consisting in transmitting waves produced by transmission sources arranged in the same related positions into the medium to be explored at different moments, consisting in picking up by at least one receiver, the signals reflected on at least one reflecting surface, in recording the transmission instants of the different waves transmitted, the time interval separating two consecutive wave transmissions each produced by one of the transmission sources being less than the time which it takes the longest wave to cover the return distance when being propagated in the medium to be explored, while each source transmits waves which are separated by an interval of time at least equal to the time which it takes the longest wave to cover this distance when being propagated in the medium, the intercorrelation or cross-correlation function of the series of transmission instants of all the sources with the series of transmission instants of any one of the said sources being such that the relationship between the amplitude of the maximum peak and the amplitude of each secondary residue is greater than a predetermined and preselected value and which is characterized in that processing the recordings obtained from the signals received on the receiver consists in regrouping the different traces of all of the recordings corresponding to the same reflection point, shifting in time each of the said traces with respect to the transmission instant of the source associated with the trace containing the information on the said reflection point, then adding all the traces thus shifted in time and relating to the said reflection point.

This makes it possible to group all the information relating to the same reflection point together and thus to achieve better knowledge of the geological layers of the medium explored. In addition, since a specific reflection point will always be hit by a source during the course of successive transmission cycles, i.e. at least one wave transmitted by a source will be reflected at this reflection point, it is not necessary to immobilize the transmission sources and receivers for each firing shot. In these conditions and still by displacement, it is possible to effect what the geophysicists call multiple coverage with a coded transmission.

In accordance with an advantageous embodiment of the method in accordance with the invention, the intersource distance $i_s$ separating two consecutive transmission sources maybe equal to a multiple k of the quotient of the intertrace distance $i_t$ separating two consecutive receivers by the number n of sources used, with $K \neq n$.

Thus the relationship could be written as follows: $i_s = k(i_t/n)$ with $K \neq n$.

According to another feature, the transmission souces maybe arranged on a line perpendicular to the displacement axis while the receivers maybe arranged in parallel rows to the displacement axis, each line of receivers being parallel to the line of the transmission sources and comprising a receiver from each row.

Thanks to this particular arrangement, coverage or prospecting of the surface which is delimited at each firing shot is improved.

In accordance with another feature, three transmission sources maybe used and the intersource distance or the spacing separating two consecutive transmission sources maybe equal to a third of the intertrace distance separating two consecutive receivers.

Referring to the drawings, when the transmissions are carried out from three sources A, B, C, mechanical waves are produced which are reflected on the strata or interfaces L of the geological layers met before reaching the receivers, arranged for this purpose, at a certain distance from the transmission sources A, B, C. In the example shown, four receivers $R_1$ to $R_4$ are used, these being separated from each other by an intertrace distance $i_t$. Similarly the transmission sources A, B, C are separated from each other by an intersource distance $i_s$.

Thus the wave produced by the source A is reflected at the reflection point $m_3$ before being received by the receiver $R_1$. The same is true for the wave produced by the transmission source B which locates or meets the reflection point $m_2$ before being received by the same receiver $R_1$, the source C locating or meeting the reflection point $m_1$. The group of reflection points $m_1$ to $m_3$ associated with the receiver $R_1$ is provided with the reference 1, while the groups of other reflection points associated with the receivers $R_2$ to $R_4$ at a first time $T_1$ are given the references 2 to 4 in a uniform manner.

When all of the transmitter-receiver sources are displaced along the axis S, for example, the other reflection points of the interface L are detected. By carefully selecting the intersource distances $i_2$ and the intertrace distances $i_t$, the reflection points $m_1$ to $m_3$ are again located by the transmission waves. Preferably, the intersource distances $i_s$ for an intertrace distance $i_t$ between two consecutive receivers in the series of receivers $R_1$ to $R_4$ are defined as being a multiple K of the quotient of the intertrace distance $i_t$ by the number of sources n, which may be written as:

$$i_s = K \frac{i_t}{n}$$

but with the coefficient $K \neq n$. In the example of FIG. 1, $i_t = 30$ m between two consecutive receivers while the intersource distance $i_s$ or the distance between two consecutive transmission sources is equal to 10 m i.e. a third of the intertrace distance $i_t$.

Thus, by displacing the assembly of transmission sources A, B, C and receivers $R_1$ to $R_4$ in accordance with the displacement axis S by a distance which is equal to $i_s$ from the positions corresponding to the shot $T_1$, the assembly of the transmission-receiver sources and the reflection points take up positions corresponding to the second shot $T_2$. It follows that the reflection points undergo a shift of the same size towards the left of FIG. 1. In these conditions the reflection point $m_1$ decided at time $T_1$, which is located or hit by the source C in the shot $T_1$, finds itself now located by the source B and recorded by the receiver $R_2$ during the course of the shot $T_2$. During the course of the shot $T_3$, it may be seen that it is located by the source A, but received by the receiver $R_3$ and so on until the last shot.

At the time of shot $T_1$, it may be seen that corresponding information $E_1$ is received which may be written schematically and symbolically by:

$$E_1(T_1 \rightarrow Cm_1R_1 + Bm_2R_1 + Am_3R_1 + \ldots$$

where the symbolic term $Jm_pR_q$ is used to define the trace recorded by the receiver $R_q$ and corresponding to the mirror point $m_p$ hit by the source $J(J = A, B, C \ldots)$. For the shot $T_1$, the reflection points under consideration, namely $m_1$ to $m_3$, are as follows:

the reflection point $m_1$ is located by the source C and the receiver $R_1$, the reflection point $m_2$ is located by the source B and the receiver $R_1$, the reflection point $m_3$ is located by the source A and the receiver $R_1$.

During the course of the shot $T_2$, the receiver $R_2$ receives the location of the reflection points $m_1$ and $m_2$ hit respectively by the sources B and A while the reflection point $m_3$, hit by the source C is still located by the receiver $R_1$. As above the second entry $E_2(T_2)$ may be written as follows:

$$E_2(T_2) \; Bm_1R_2 + Am_2R_2 + Cm_3R_1 + \ldots$$

By grouping all of this information and arranging it in relation to different reflection points $m_1$ to $m_3$, the table is obtained, which is not limited to the six shots indicated in this example in order to facilitate understanding of the subject of the invention, and may comprise any desired number of shots.

$$\begin{aligned}
E_1(T_1) &\to C\, m_1 R_1 + B\, m_2R_1 + A m_3 R_1 + \ldots \\
E_2(T_2) &\to B\, m_1 R_2 + A\, m_2R_2 + C m_3 R_1 + \ldots \\
E_3(T_3) &\to A\, m_1 R_3 + C\, m_2R_2 + B m_3 R_2 + \ldots \\
E_4(T_4) &\to C\, m_1 R_3 + B\, m_2R_3 + A M_3 R_3 + \ldots \\
E_5(T_5) &\to B\, m_1 R_4 + A\, m_2R_4 + C m_3 R_3 + \ldots \\
E_6(T_6) &\to A\, m_1 R_5 + C\, m_2R_4 + B m_3 R_4 + \ldots
\end{aligned}$$

In order that the regrouping of the different traces of all of the recordings corresponding to the same reflection point should be usable, it is necessary for the wave transmissions of the different sources to be distributed over time in a manner for example, defined in U.S. Pat. No. 3,956,730 for the same shot $T_1, \ldots T_n$ in order that the intervals of time between the transmissions produced by each of the sources are not in phase again. On the traces arranged in relation to the reflection point under consideration, normal dynamic corrections which are well known in seismic exploration are carried out.

Then each of the said traces is shifted in time in relation to the transmission moment of the source, its associated trace containing the information relative to the reflection point under consideration. Thus the shot moment $T_1$ of the source C of recording $E_1$ is adjusted to zero resulting in transmission moments and laterally shifted corresponding pulses in relation to the reference zero. For recording $E_1$ this shift is located on the same side, since the source C is the last to be transmitted.

For registering $E_2$, the moment of the shot $T_2$ of the source B is set to zero, its associated curve containing the reflection point $m_1$. From then onwards the transmission moments and the corresponding pulses are situated on both sides of the reference zero.

For recording $E_3$ the transmission instant of the shot $T_3$ of source A is taken as origin, and so on for the other recordings.

The curves thus shifted in time, in which one particular reflection point has been favoured, the reflection point $m_1$ in the selected example, are added in order to make it possible to obtain a recording which may be used and in which the information relative to the reflection point $m_1$ is maximized while the information relating to other reflection points is minimized.

An example of distribution of the transmission moments capable of being used could be as follows if the beginning of transmission produced by the source A is taken as reference moment O for each shot.

| T (shot) | A | B | C |
|---|---|---|---|
| $T_1$ | 0 | $\alpha$ | $2\alpha$ |
| $T_2$ | 0 | $\alpha + \epsilon$ | $2.(\alpha + \epsilon)$ |
| $T_3$ | 0 | $\alpha + 2\epsilon$ | $2.(\alpha + 2\epsilon)$ |
| $T_4$ | 0 | $\alpha + 3\epsilon$ | $2.(\alpha + 3\epsilon)$ |
| $T_5$ | 0 | $\alpha + 4\epsilon$ | $2.(\alpha + 4\epsilon)$ |
| $T_6$ | 0 | $\alpha + 5\epsilon$ | $2.(\alpha + 5\epsilon)$ |

By taking $\alpha = 6$ ms and $\epsilon = 1$ ms, the table below is written as follows:

| | | |
|---|---|---|
| $T_1 \to 0$ | 6 | 12 |
| $T_2 \to 0$ | 7 | 14 |
| $T_3 \to 0$ | 8 | 16 |
| $T_4 \to 0$ | 9 | 18 |
| $T_5 \to 0$ | 10 | 20 |
| $T_6 \to 0$ | 11 | 22 |

Figure 2:
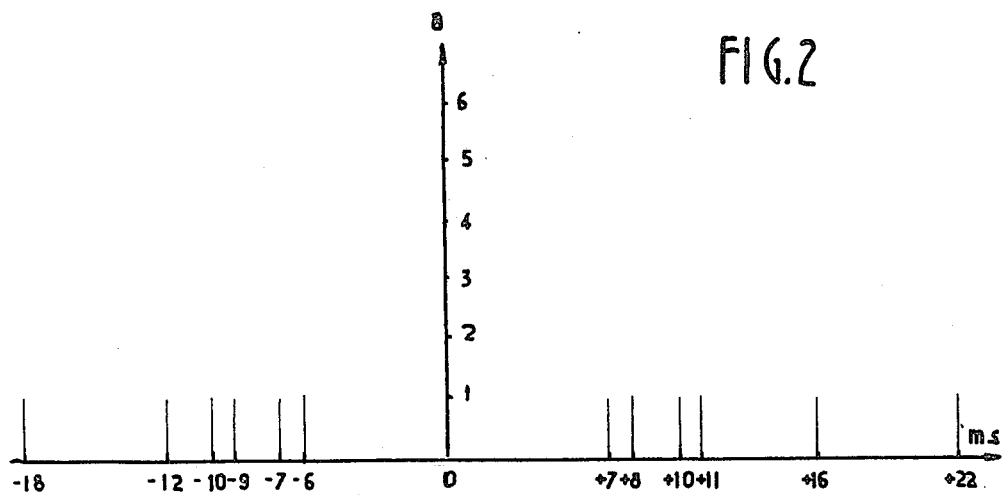
FIG. 2 is a view of the function of correlation obtained with a predetermined and preselected transmission code.

By adding the curves in relation to the reflection point $m_1$ it may be seen in the view of FIG. 2 showing the amplitude as a function of time, that a maximum peak amplitude 6 is present when six shots are carried out by arbitrarily taking the amplitude of each pulse transmitted which is equal to 1; in general, in these conditions, the amplitude of the maximum peak is N for N shots or transmission sequences when all of the traces are adjusted and are in phase in relation to a reference point; this maximum peak is limited by secondary lobes of an amplitude equal to that of the correlation residues, or equal to 1.

It is stated that on both sides of the origin of shift of the different recordings there is no transmission in phase with each other which makes it possible to obtain a maximum peak which is clearly differentiated from the secondary peaks relating to other reflection points.

It is obvious that the adjustment and addition may be effected in relation to any reflection point $m_p$ in accordance with what has been indicated above.

In accordance with a preferred embodiment of the invention the transmission sources A, B, C are in alignment with the receivers $R_1$ to $R_4$ either on the displacement axis S or parallel to this axis.

Figure 3:
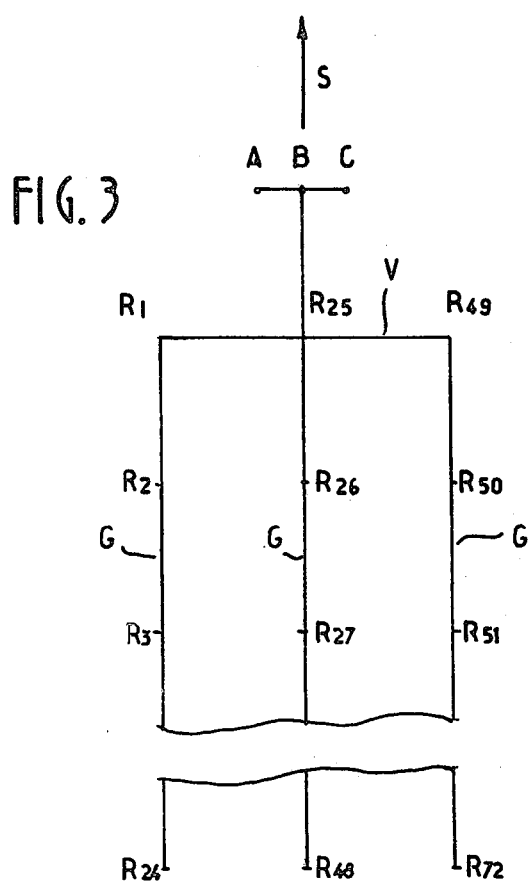
FIG. 3 is a schematic view of an assembly of three sources associated with 72 receivers in accordance with a method of arrangement preferred in the invention.

For multiple coverage, using for example 24 receivers divided into $2 \times 12$ or 72 receivers divided into $6 \times 12$ or $3 \times 24$, the transmission sources A, B, C are arranged on a line perpendicular to the displacement axis S while the receivers may be arranged according to the rows G parallel to the displacement axis S, each of the lines of receivers V parallel to the transmission source line being capable of comprising a receiver from each row. In FIG. 3 a grouping of 72 receivers arranged in accordance with three rows G of 24 receivers $R_1$ to $R_{24}$, $R_{25}$ to $R_{48}$ and $R_{49}$ to $R_{72}$ is shown. In each row G the receivers are separated by an intertrace distance $i_t$ which is defined above and equal to 30 m in the drawing when the intersource distance is 10 m.

Quite obviously these indications of distance are given as an indication and to enable better understanding of the invention. In the exploration zone other actual and normally used distances are selected.

It will be noted that on each line V parallel to the line of the transmission sources the receivers are equally separated by an intertrace distance $i_t$; the same is true along each row G.

It will be understood that the above description of the present invention is susceptible to various modification changes and adaptations.

What is claimed is:

1. A seismic exploration method with high spatial resolution comprising, locating a line of receivers in longitudinally spaced relation, locating a line of transmission sources in spaced relation to each other, generating seismic waves at each of said sources, controlling the transmission of said waves by said transmission sources, to provide wave transmission intervals between sources less than the time taken for the longest wave to travel through the medium to be explored from said transmission sources to said receivers and to provide wave transmission intervals between repetitions of each source at least equal to said time taken for said longest wave to travel from said transmission source to said receiver, receiving on the receivers signals produced by reflection of said waves at reflection points in said medium to be explored and recording said received signals, displacing said receivers and sources along the seismic line to be explored after each transmission of waves by a distance equal to the source spacing in such a manner that a source takes the place of a preceding source, processing said recorded signals by grouping all the recorded signals corresponding to the same reflection point, shifting in time each of said recorded traces with respect to the transmission instants of the corresponding source to place into coincidence the respective transmission instants of sources the seismic paths of which reach a predetermined reflection point, and adding all said shifted in time recorded traces relating to the same reflection point.

2. A method according to claim 1 wherein the sources and receivers of the lines are arranged substantially in accordance with the formula $i_s = (k/n)i_t$ where:
$i_s$ is the distance between two consecutive sources,
$i_t$ is the distance between two consecutive receivers,
n = the number of sources, and
k = a constant which does not equal n.

3. A method as defined in claim 1, and comprising arranging said transmission sources in lines in alignment with said at least one receiver.

4. A method as defined in claim 1, comprising using several transmission sources and several receivers capable of being displaced in accordance with a displacement axis for marine seismology, arranging said transmission sources on a line perpendicular to said displacement axis, and arranging said receivers in rows parallel to said displacement axis with each line of receivers being parallel to the line of said transmission sources and comprising a receiver from each row.

* * * * *